US011608593B2

(12) United States Patent
Yamamoto et al.

(10) Patent No.: US 11,608,593 B2
(45) Date of Patent: Mar. 21, 2023

(54) WIRE ROPE, SHEAVE AND DRUM

(71) Applicant: TOKYO ROPE MANUFACTURING CO., LTD., Tokyo (JP)

(72) Inventors: Yukito Yamamoto, Tokyo (JP); Takuya Katayama, Tokyo (JP); Shigeki Watanabe, Tokyo (JP)

(73) Assignee: TOKYO ROPE MANUFACTURING CO., LTD., Tokyo (JP)

( * ) Notice: Subject to any disclaimer, the term of this patent is extended or adjusted under 35 U.S.C. 154(b) by 268 days.

(21) Appl. No.: 16/804,899

(22) Filed: Feb. 28, 2020

(65) Prior Publication Data

US 2020/0199815 A1 Jun. 25, 2020

Related U.S. Application Data

(63) Continuation of application No. PCT/JP2018/030335, filed on Aug. 15, 2018.

(30) Foreign Application Priority Data

Aug. 29, 2017 (JP) .............................. JP2017-164101

(51) Int. Cl.
*D07B 1/06* (2006.01)
*D07B 1/00* (2006.01)
*D07B 1/16* (2006.01)
*B66B 7/06* (2006.01)

(52) U.S. Cl.
CPC ........... *D07B 1/0686* (2013.01); *D07B 1/005* (2013.01); *D07B 1/162* (2013.01); *B66B 7/06* (2013.01)

(58) Field of Classification Search
CPC ....... D07B 1/005; D07B 1/0686; D07B 1/162
See application file for complete search history.

(56) References Cited

U.S. PATENT DOCUMENTS

| 2007/0241480 A1* | 10/2007 | Kanenari | C08J 3/226 |
| | | | 152/548 |
| 2008/0314016 A1* | 12/2008 | Itaya | D07B 1/0673 |
| | | | 57/210 |
| 2013/0055696 A1* | 3/2013 | Hachisuka | D07B 1/0686 |
| | | | 57/224 |
| 2014/0374195 A1* | 12/2014 | Deconinck | B66B 9/00 |
| | | | 57/221 |
| 2016/0060077 A1* | 3/2016 | Haapaniemi | B66B 9/00 |
| | | | 187/255 |

(Continued)

FOREIGN PATENT DOCUMENTS

| JP | 2008248426 A | 10/2008 |
| JP | 2010202404 A | 9/2010 |

(Continued)

*Primary Examiner* — Shaun R Hurley
(74) *Attorney, Agent, or Firm* — Dickinson Wright PLLC (57) ABSTRACT

An object of the present invention is to further improve upon the strength and durability of a wire rope. A wire rope has a core rope made of steel; a covering layer, which is made of a composite resin, covering the outer peripheral surface of the core rope; and multiple side strands, which are made of steel, wound on the outer peripheral surface of the core rope covered with the covering layer. The composite resin constituting the covering layer is obtained by blending cellulose nanofibers with polypropylene serving as a matrix.

11 Claims, 5 Drawing Sheets

(56) References Cited

U.S. PATENT DOCUMENTS

| | | | | |
|---|---|---|---|---|
| 2016/0177084 A1* | 6/2016 | Hamada | ................. | C08J 5/24 |
| | | | | 523/447 |
| 2016/0201259 A1* | 7/2016 | Suefuji | ............... | B60C 9/0007 |
| | | | | 57/221 |
| 2018/0251940 A1* | 9/2018 | Carter | ................ | D07B 1/144 |
| 2018/0362300 A1* | 12/2018 | Mitsui | ................. | B66B 7/06 |
| 2019/0203412 A1* | 7/2019 | Watanabe | ............ | D07B 1/165 |

FOREIGN PATENT DOCUMENTS

| | | | | |
|---|---|---|---|---|
| JP | 2011148609 A | 8/2011 | | |
| JP | 2013248824 A | 12/2013 | | |
| WO | WO-0050687 A1 * | 8/2000 | ............. | B66B 7/06 |
| WO | 2002010050 A1 | 2/2002 | | |

\* cited by examiner

WIRE ROPE, SHEAVE AND DRUM

CROSS REFERENCE TO RELATED APPLICATIONS

This application is a Continuation Application of PCT International Application No. PCT/JP2018/030335 filed on Aug. 15, 2018 which claims priority to Japanese Patent Application No. 2017-164101 filed on Aug. 29, 2017, the entire disclosures of the applications being considered part of the disclosure of this application and hereby incorporated by reference.

TECHNICAL FIELD

The present invention relates to a wire rope, a sheave and a drum.

BACKGROUND OF THE INVENTION

A wire rope used in elevators, cranes, condolas ropeways, lifts and the like is passed through a sheave and wound on a drum while under a load. When passed through the sheave or when wound on the drum, the wire rope makes strong contact with (chafes against) the sheave or drum. In addition, a core rope comes into strong contact with side strands that constitute the wire rope, and the side strands also make strong contact with each other. Owing to repeated strong contact, the wire rope gradually wears out and is more likely to break. When the wire rope breaks, its strength decreases.

In order to reinforce the strength and durability of a wire rope, wire ropes have been developed in which a core rope placed at the center is coated with a thermoplastic resin, and one in which spacers of thermoplastic resin are inserted between multiple side strands twisted together around a core rope (for example, refer to Japanese Patent Application Laid-Open No 2008-248426). Owing to the presence of the thermoplastic resin between the core rope and side strands or between mutually adjacent side strands, the wear resistance of the wire rope is improved upon and, as a result, so are its strength and durability.

However, thermoplastic resin exhibits a somewhat small compressive stress and tends to undergo deformation by application of a strong force in the direction of compression. Further, if the thermoplastic resin itself sustains wear, there are instances where the core rope and side strands come into contact or where the side strands contact each other.

BRIEF DESCRIPTION OF THE INVENTION

An object of the present invention is to further improve upon the strength and durability of a wire rope.

A further object of the present invention is to provide a wire rope that will not easily break.

Yet another object of the present invention is to provide a wire rope of improved service life.

A wire rope according to a first aspect of the present invention comprises: a core rope made of metal; a covering layer covering the outer peripheral surface of the core rope; and multiple side strands made of metal wound on the outer peripheral surface of the core rope covered with the covering layer; wherein the covering layer is made of a composite resin in which cellulose nanofibers are blended with a matrix resin.

A wire rope according to a second aspect of the present invention comprises: a core material; and multiple side strands made of metal wound on the outer peripheral surface of the core material; wherein the core material is made of a composite resin in which cellulose nanofibers are mixed with a matrix resin.

Preferably, spacers are placed between mutually adjacent side strands constituting the wire rope according to the first and second aspects of the present invention, the spacers being made of the composite resin.

According to the present invention, a composite resin in which cellulose nanofibers are blended with a matrix resin is provided at portions of a wire rope (between a core rope and side strands, between mutually adjacent side strands, or on the core material itself) where wear tends to be caused by contact. The composite resin exhibits a comparatively high compressive stress and will not readily be deformed even if subjected to a strong force in the direction of compression. There is little wear due to friction and the resin will not readily wear out. Contact between the core rope and side strands and contact between mutually adjacent side strands can be prevented over a long period of time and the wire rope is improved in strength and durability. According to fatigue tests, it has been confirmed that rope service life is improved markedly in comparison with cases where use is made solely of a matrix resin with which cellulose nanofibers are not blended.

Preferably, cellulose nanofiber content in the composite resin is 5 to 50 wt %.

The matrix resin mentioned above can be selected from among polyethylene, polypropylene, polyurethane, polyamide, polyphenylene ether, polyoxymethylene, polyester, polylactam, fluorine and epoxy.

The present invention also provides a sheave made of metal in which a groove with which a wire rope will be engaged is formed in an outer peripheral portion and a composite resin in which cellulose nanofibers are blended with a matrix resin is provided on the surface of the groove, as well as a drum made of metal having a drum portion on which a wire rope will be wound, a composite resin in which cellulose nanofibers are blended with a matrix resin being provided on the outer peripheral surface of the drum portion.

DETAILED DESCRIPTION OF THE INVENTION

Figure 1:
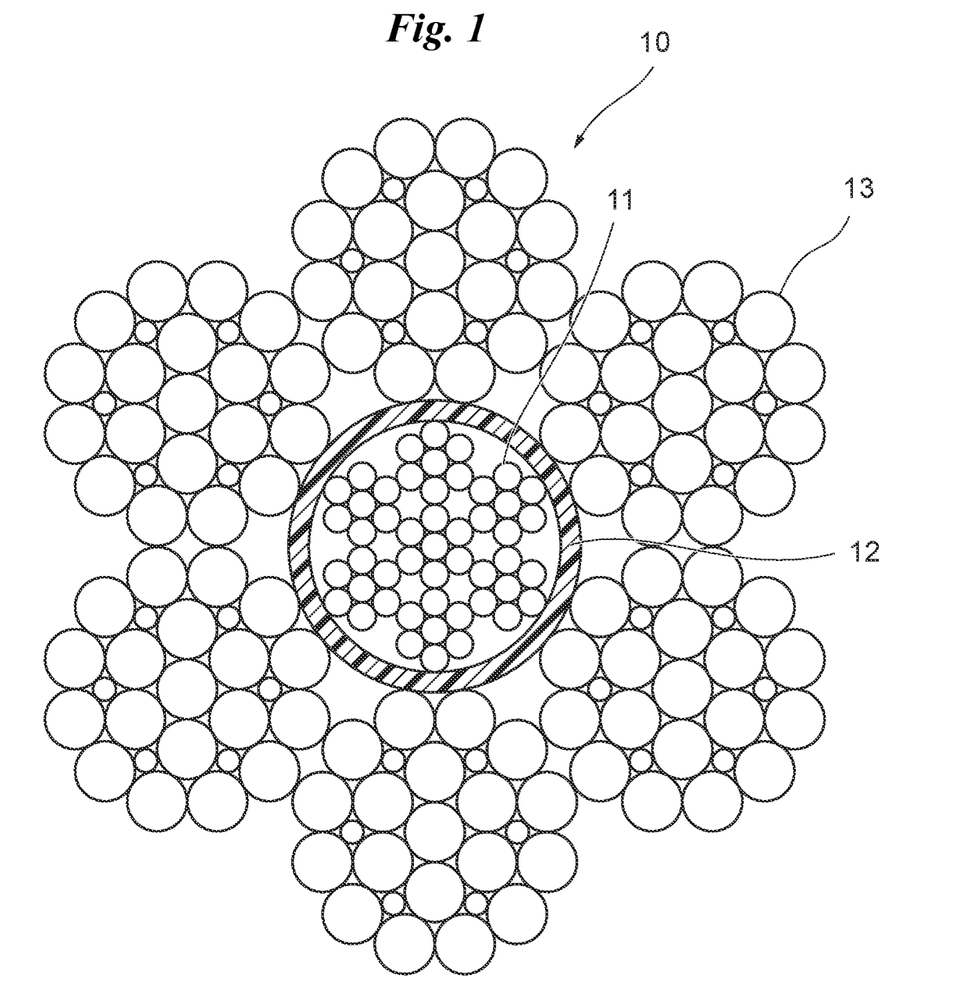
FIG. 1 is a transverse sectional view of a wire rope.

FIG. 1 is an enlarged transverse sectional view of a wire rope 10 according to an embodiment of the present invention. The wire rope 10 comprises a single core rope 11, a covering layer 12 covering the outer peripheral surface of the wire rope 10, and six side strands 13 twisted together around the core rope 11 covered with the covering layer 12.

The core rope 11, which is made of steel and referred to as an IWRC (Independent Wire Rope Core), has a 7×7 structure in which six side members having the same structure as a 1×6 single core member are twisted together around the core member. Each side strand 13 is made of steel and comprises a single core wire, six inner-layer wires twisted together around the core wire, six filler wires placed in valleys between mutually adjacent ones of the inner-layer wires, and 12 outer-layer wires twisted together around the filler wires. The wire rope 10 is expressed in the manner 6×Fi (25) or 6×Fi (1+6+(6)+12).

The covering layer 12 covering the outer peripheral surface of the core rope 11 is one in which cellulose nanofibers are blended with (contained in) a resin serving as a matrix. In the description that follows, the result of blending the cellulose nanofibers with the resin will be referred to as a "composite resin" or "CNF composite resin". The details of the composite resin will be described later. Although the covering layer 12 shown in FIG. 1 is illustrated so as to have an annular shape in cross-section along the outer peripheral surface of the core rope 11, the composite resin constituting the covering layer 12 can also be made to penetrate into the valleys between the side members that constitute the core rope 11.

Figure 2:
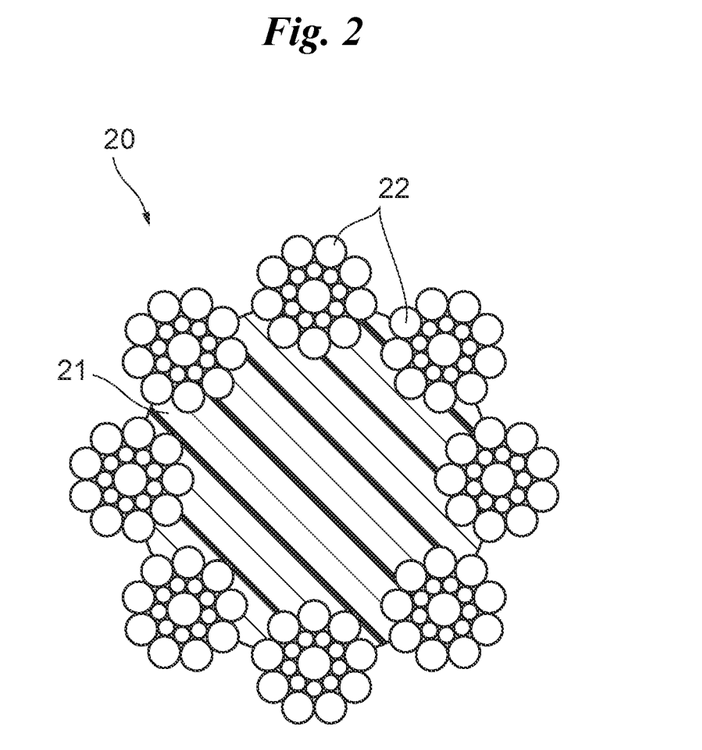
FIG. 2 is a transverse sectional view of a wire rope according to another embodiment.

FIG. 2 is a transverse sectional view of a wire rope 20 according to another embodiment of the present invention. The wire rope 20 is obtained by placing a core material 21, which has a circular cross-section and consists of the composite resin, at the center and twisting eight steel side strands 22 together around the core material 21. Each side strand 22 has a 1+9+9 structure and is made by twisting 19 wires together.

Figure 3:
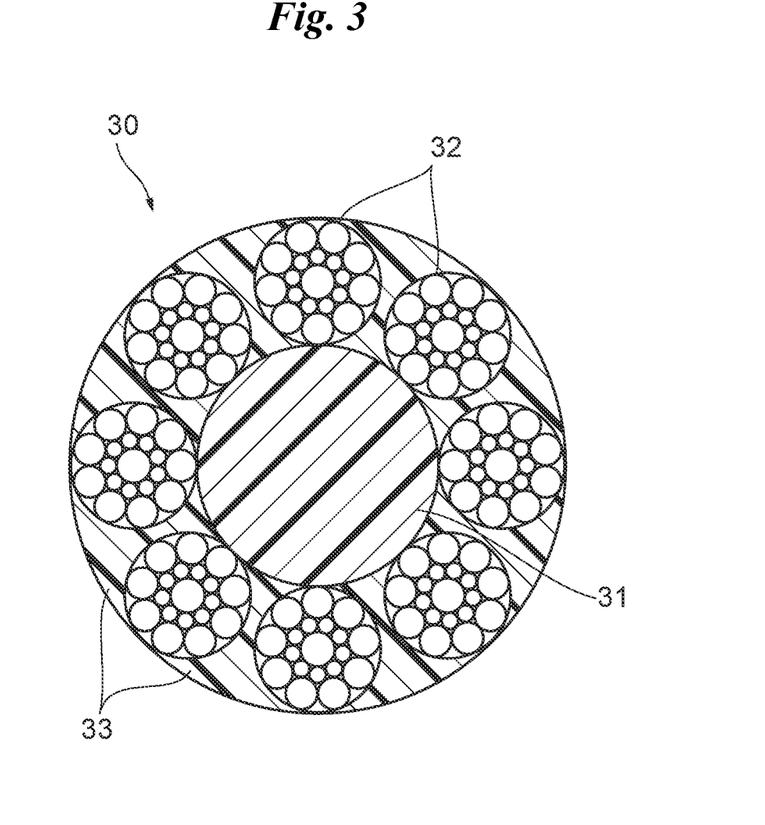
FIG. 3 is a transverse sectional view of a wire rope according to a further embodiment.

FIG. 3 is a transverse sectional view of a wire rope 30 according to a further embodiment of the present invention. The wire rope 30 is obtained by placing a core material 31, which has a circular cross-section and consists of the composite resin, at the center, twisting eight steel side strands 32 together around the core material 31 and inserting spacers 33, which consist of the composite resin, between mutually adjacent ones of the side strands 32. The spacers 33 also are twisted together around the core material 31. Each side strand 32 illustrated has an 8×S(19) structure.

The composite resin constituting the covering layer 12, core materials 21, 31 and spacers 33 is obtained by blending cellulose nanofibers with a resin, as mentioned above. For example, the composite resin is made by blending, at a predetermined ratio, pellets of polypropylene resin and pellets of a master batch in which cellulose nanofibers are mixed with polypropylene resin at a weight ratio of 50% (50 wt %), and heating and kneading at a set temperature of 180° C. The heated and kneaded composite resin can be processed into any shape, for example, that of the above-mentioned covering layer 12, core materials 21, 31 or spacers 33, by extrusion molding or injection molding.

Table 1 illustrates test results for tensile strength, bending strength, compressive stress and amount of wear with respect to specimens fabricated using respective ones of four types of composite resin (resins having cellulose nanofibers of 5, 10, 20 and 30 wt %) produced by changing the mixing ratio of the pellets of the master batch obtained by blending the polypropylene resin pellets and cellulose nanofibers at a weight ratio of 50%; results of observation regarding state of dispersion of the cellulose nanofibers in each of the four types of composite resin; and fatigue test results for four types of the above-mentioned wire rope 10 (FIG. 1) having the covering layer 12 prepared using respective ones of the four types of composite resin. For comparison, the table illustrates test results regarding polypropylene resin alone (namely without the inclusion of cellulose nanofibers, the blending ratio of the master batch being 0) (referred to as "unblended resin" below).

The specimens used were obtained by molding the composite resins to predetermined dimensions using an injection molding machine. The covering layer 12 of the wire rope 10 was applied to the outer peripheral surface of the core rope 11 by extruding the composite resin toward a crosshead die using a single-screw extruder and passing the core rope 11 of diameter 11.2 mm through the crosshead die. The thickness of the covering layer 12 was made 0.5 mm.

TABLE 1

| | BLENDING RATIO POLYPROPYLENE RESIN | | | | |
|---|---|---|---|---|---|
| | 50 | 45 | 40 | 30 | 20 |
| | | MASTER BATCH (CNF50%) | | | |
| | 0 | 5 | 10 | 20 | 30 |
| TENSILE STRENGTH (MPa) | 30 | 39 | 45 | 43 | 40 |
| BENDING STRENGTH (MPa) | 35 | 45 | 47 | 45 | 45 |
| COMPRESSIVE STRESS (MPa) | 40 | 60 | 65 | 65 | 55 |
| AMOUNT OF WEAR (mg/1000 TEST TRIALS) | 60 | 25 | 15 | 13 | 12 |
| DISPERSION STATE (NUMBER/mm$^2$) | — | 5 | 8 | 20 | 25 |
| FATIGUE TEST (TEST TRIALS) | BROKE AT 400,000 TRIALS | BROKE AT ABOVE 1,000,000 TRIALS | BROKE AT ABOVE 1,000,000 TRIALS | BROKE AT ABOVE 1,000,000 TRIALS | BROKE AT ABOVE 1,000,000 TRIALS |

(1) Tensile Strength Test

In accordance with JIS K7161-1 (ISO 527-1), the specimen was tensioned at a fixed speed along its main axis (the length direction) until the specimen was destroyed, and the force applied to the specimen was measured. Initial maximum stress observed during the test was adopted as the tensile strength (in MPa units).

(2) Bending Test

In accordance with JIS K7171 (ISO 178), the specimen, which had a rectangular cross-section, was placed on two supports, the central portion thereof was subjected to a force by an indenter and the specimen was caused to bend. The central portion between the points of support was caused to bend at a fixed speed until either the maximum strain of the specimen reached 5% or its outer surface was destroyed, and the force applied to the specimen was measured. Maximum bending stress that the specimen could withstand was adopted as the bending strength (in MPa units).

(3) Compression Test

In accordance with JIS K7181 (ISO 604), the force received by the specimen when it was compressed at a fixed speed along its main axis was measured. Because polypropylene does not undergo compression failure, the value obtained by dividing the compressive force applied to the specimen at occurrence of a compressive strain of 10% by the initial surface area of the specimen was adopted at the compressive stress.

(4) Wear Test

In accordance with JIS K7204 (ISO 9352), the specimen was subjected to grinding using a wear tester. The weight of the specimen after grinding was subtracted from its weight before grinding and the difference was adopted as the amount of wear (in units of mg/1000 test trials).

(5) State of Dispersion

A cross-section of the specimen was observed under an electron microscope and a check was made to determine how many aggregates of cellulose nanofibers having a major axis of 100 micrometers or greater were present per square millimeter.

(6) Fatigue Test

The wire rope 10 was placed in a rope fatigue tester and underwent a flexing test. The condition of the wires of the wire rope 10 following the completion of the flexing test was checked and it was deemed that breakage occurred for a wire rope for which 10% or more of its wires broke.

According to the test results, it was confirmed that the tensile strength, bending strength and compressive stress of the composite resin were all improved upon in comparison with the unblended resin.

With regard to the amount of wear, the amount of abrasion powder produced from the specimens of the composite resin was less than half in comparison with the amount of abrasion powder produced from the specimen of the unblended resin, and it was confirmed that wear resistance was improved considerably. It will be understood that the composite resin is more difficult to wear down in comparison with the unblended resin.

Furthermore, from the results of observing the state of dispersion, it was found that there were few aggregates of cellulose nanofibers included in the composite resin, and that the cellulose nanofibers were well dispersed in the polypropylene resin. However, it was confirmed that the more the amount of cellulose nanofibers blended with the composite resin increases, the more the aggregates increase. Since an increase in the aggregates means a decline in homogeneity, it can be construed that the fewer the aggregates, the higher the quality. Based on the present test results, it was confirmed that a composite resin blended such that 40 to 10 will be the mixing ratio of polypropylene resin pellets to pellets of the master batch in which cellulose nanofibers are blended at a weight ratio of 50%, namely such that the cellulose nanofibers will take on a weight ratio on the order of 10% (10 wt %), will bring about a well-balanced improvement in quality. Even if the content of the cellulose nanofibers is 5 wt %, however, the mechanical performance (tensile strength, bending strength, compressive stress and wear resistance) of the composite resin is still improved in comparison with the unblended resin, and the durability of the wire rope 10 using this composite resin is improved greatly as well. Since the master batch contains 50 wt % of the cellulose nanofibers, the content of the cellulose nanofibers in the composite resin constituting the covering layer 12, core materials 21, 31 and spacers 33 can be made 5 to 50 wt %.

Cellulose nanofibers have a specific gravity of 0.9, and resin with which the cellulose nanofibers have been blended makes it possible to obtain the result of a reduction in weight. Further, since the cellulose-nanofiber raw material is naturally occurring, it is biocompatible and biodegradable. Hence, the burden on the environment when the wire rope using the composite resin is disposed of is smaller than before. Furthermore, based on the results of the wear test, the composite resin blended with the cellulose nanofibers does not wear out easily, and since cellulose adapts itself to oil, a decline in lubricity is suppressed and a further improvement in rope life is achieved.

Figure 4:
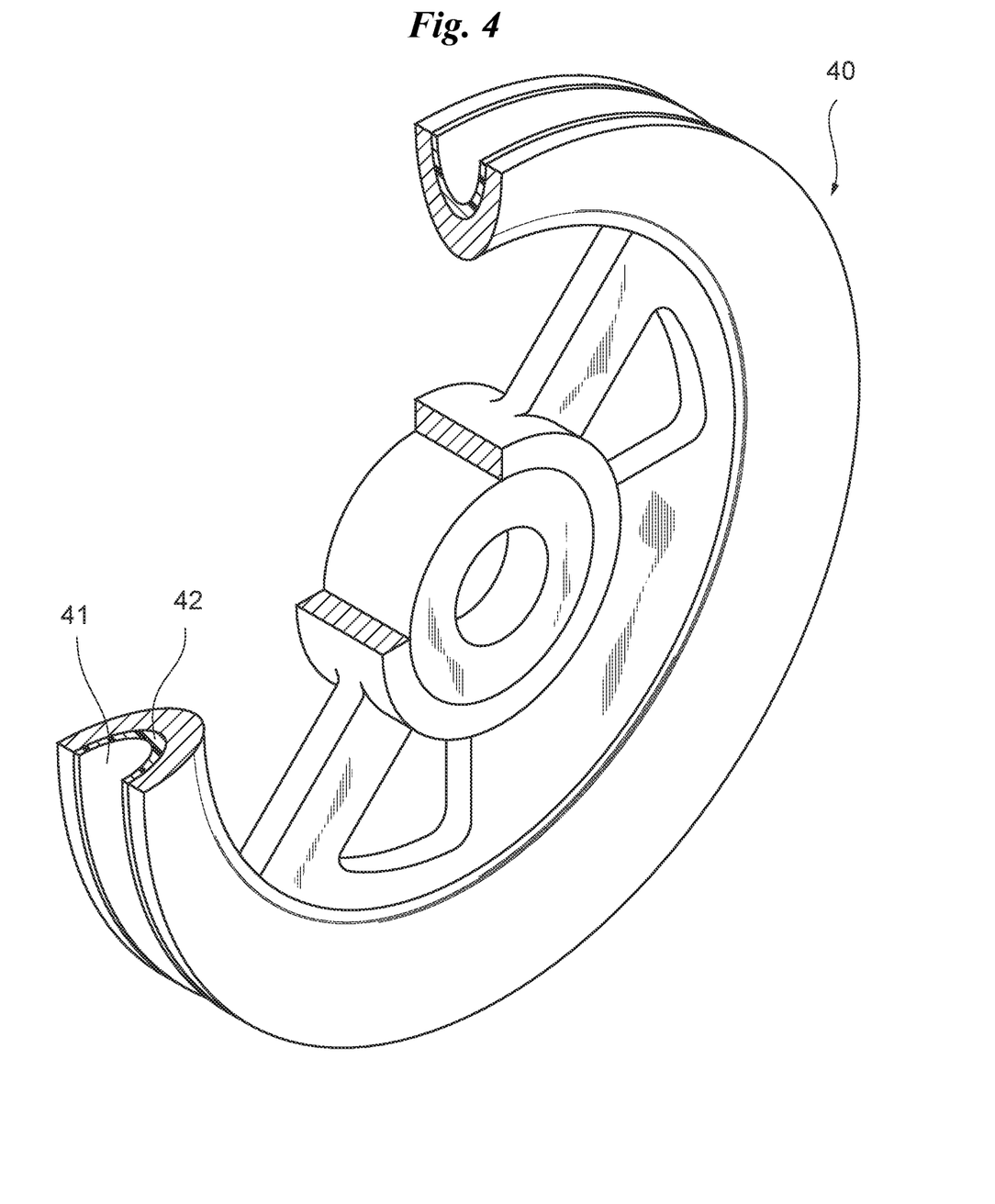
FIG. 4 is a perspective view, partially broken away, of a sheave.

FIG. 4 is a perspective view, partially broken away, showing a sheave with which the wire rope 10, 20 or 30 will be engaged. The wire rope 10, 20 or 30 is laid in a groove 41 formed in the outer peripheral surface of a sheave 40 made of metal.

Figure 5:
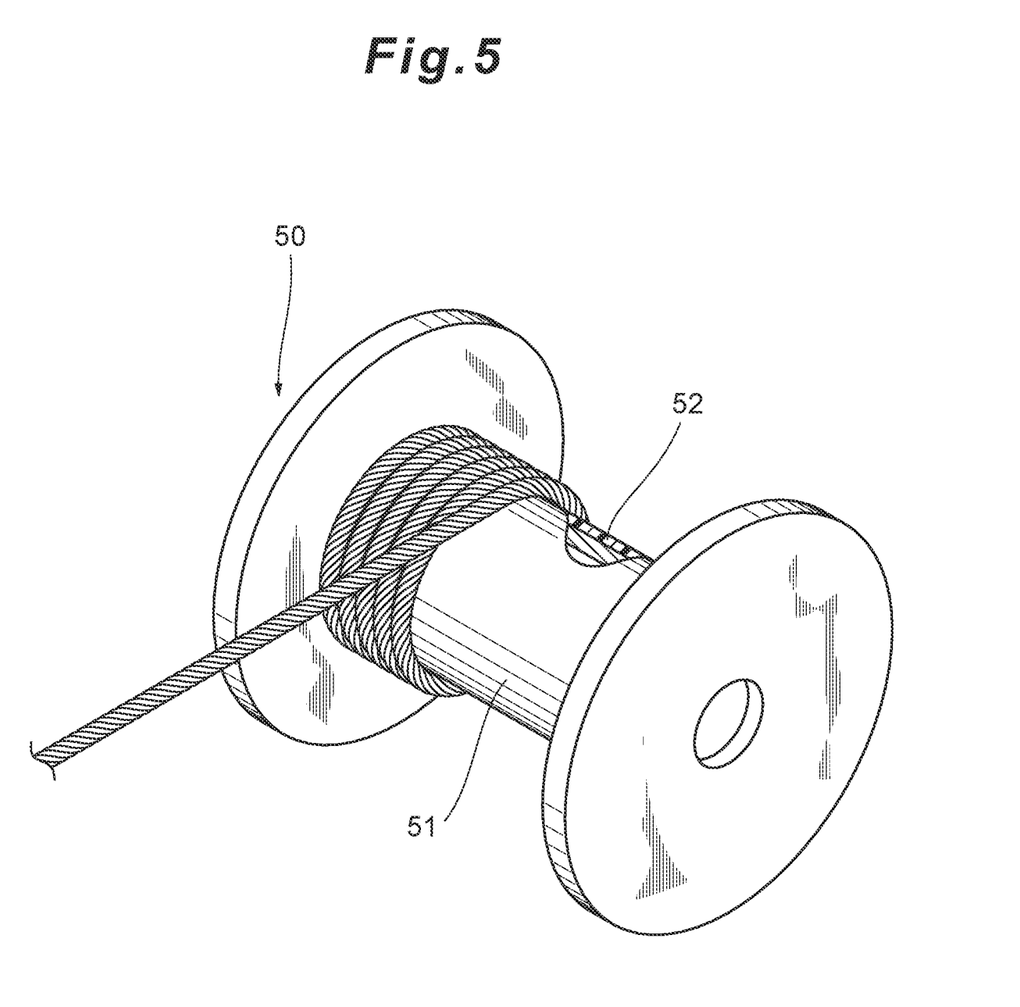
FIG. 5 is a perspective view of a drum on which a wire rope is wound.

FIG. 5 shows a composite resin (coating) 52 is provided on the outer peripheral surface 50 of the drum portion 51.

The surface of the groove 41 of sheave 40 where strong contact is made with the wire rope 10, 20 or 30 is provided with a coating 42 made of the composite resin described above. By providing the groove 41 of sheave 40 with the coating 42 made of the composite resin, direct contact between the wire rope 10, 20 or 30 and the groove 41 of sheave 40 is avoided, enabling wear of the wire rope 10, 20 or 30 to be reduced.

In a metal drum having a drum portion around which the wire rope 10, 20 or 30 is wound, the outer peripheral surface of the drum portion may be provided with the coating made of the composite resin. Direct contact between the wire rope 10, 20 or 30 and the drum portion of the drum is avoided, enabling wear of the wire rope 10, 20 or 30 to be reduced.

In the embodiment set forth above, an example in which polypropylene is used as the matrix resin of the composite resin is described. Instead of polypropylene, however, use can also be made of polyethylene, polyurethane, polyamide, polyphenylene ether, polyoxymethylene, polyester, polylactam, fluorine or epoxy.

What is claimed is:

1. A wire rope comprising:
   a core rope made of metal;
   a covering layer covering the outer peripheral surface of said core rope; and
   multiple side strands made of metal wound on the outer peripheral surface of said core rope covered with said covering layer;
   wherein said covering layer is made of a composite resin in which cellulose nanofibers are blended with a matrix resin.

2. A wire rope according to claim 1 wherein spacers are placed between mutually adjacent side strands;
   said spacers being made of said composite resin.

3. A wire rope according to claim 1, wherein content of the cellulose nanofibers in said composite resin is 5 to 50 wt %.

4. A wire rope according to claim 1, wherein the matrix resin is any one among polyethylene, polypropylene, polyurethane, polyamide, polyphenylene ether, polyoxymethylene, polyester, polylactam, fluorine and epoxy.

5. A wire rope comprising:
   a core material; and
   multiple side strands made of metal wound on the outer peripheral surface of said core material;

wherein said core material is made of a composite resin in which cellulose nanofibers are mixed with a matrix resin.

6. A wire rope according to claim 5, wherein spacers are placed between mutually adjacent side strands; said spacers being made of said composite resin.

7. A wire rope according to claim 5, wherein content of the cellulose nanofibers in said composite resin is 5 to 50 wt %.

8. A wire rope according to claim 5, wherein the matrix resin is any one among polyethylene, polypropylene, polyurethane, polyamide, polyphenylene ether, polyoxymethylene, polyester, polylactam, fluorine and epoxy.

9. A wire rope comprising:
   a core selected from one of (i) a composite resin core material or (ii) a core rope made of metal and having a composite resin covering layer covering the outer peripheral surface of said core rope;
   multiple side strands made of metal wound on the outer peripheral surface of said core; and
   wherein said composite resin core material and said composite resin covering layer are formed of a composite resin in which cellulose nanofibers are blended with a matrix resin.

10. A wire rope according to claim 9 wherein content of the cellulose nanofibers in said matrix resin is 5 to 50 wt %.

11. A wire rope according to claim 9 wherein the matrix resin is any one among polyethylene, polypropylene, polyurethane, polyamide, polyphenylene ether, polyoxymethylene, polyester, polylactam, fluorine and epoxy.

* * * * *